United States Patent
Andrews et al.

(10) Patent No.: US 6,324,645 B1
(45) Date of Patent: *Nov. 27, 2001

(54) RISK MANAGEMENT FOR PUBLIC KEY MANAGEMENT INFRASTRUCTURE USING DIGITAL CERTIFICATES

(75) Inventors: Richard F Andrews, Menlo Park; Peter Williams, Fremont; Judy Lin, Mountain View, all of CA (US)

(73) Assignee: VeriSign, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,289

(22) Filed: Aug. 11, 1998

(51) Int. Cl.$^7$ ...................................................... H04K 1/00
(52) U.S. Cl. .......................... 713/157; 380/30; 380/282; 380/285; 713/175; 713/176; 713/170; 713/168; 713/169; 713/156
(58) Field of Search ..................................... 713/176, 175, 713/170, 169, 168, 157, 156; 380/30, 282, 285

(56) References Cited

U.S. PATENT DOCUMENTS

| 5,546,465 | 8/1996 | Kim ......................................... 381/18 |
| 5,638,343 | 6/1997 | Ticknor ..................................... 369/4 |
| 5,920,630 | * 7/1999 | Wertheimer ............................. 380/25 |
| 6,009,173 | * 12/1999 | Sumner ................................... 380/21 |
| 6,038,322 | * 10/1998 | Harkins ................................. 380/279 |

FOREIGN PATENT DOCUMENTS

| 19628261 | 2/1997 | (DE) ............................. G10K/15/04 |

OTHER PUBLICATIONS http://www.ietf.org/rfc/rfc2527.txt.*
http://www.pixelcomposer.com/ecommerceb.html.*

* cited by examiner

Primary Examiner—Phung M. Chung
Assistant Examiner—Todd Jack
(74) Attorney, Agent, or Firm—Fenwick & West LLP

(57) ABSTRACT

A public key management infrastructure (104) is shared by at least two users (102). A method (300) for managing risk arising from a user's use of the shared public key management infrastructure (104) includes the following steps. The user (102) is associated (301) with a digital certificate (200) which is issued and digitally signed by a certification authority (CA). The digital certificate (200) represents that the user (102) is bound to a public key (210) corresponding to a private key held by the user (102); the public key (210) and the private key form a key pair for use in public-key cryptography. The digital certificate (200) further includes an access label (216), which may identify the domain (105) within the public key management infrastructure (104) which the user (102) is authorized to access and/or the privileges which the user (102) is authorized to exercise. The user's identity and the validity of the digital certificate (200) are established (303,305). The access label (216) is read (304) from the user's digital certificate (200), and the user's use of the public key management infrastructure (104) is controlled (306) based upon the access label (216).

16 Claims, 6 Drawing Sheets

RISK MANAGEMENT FOR PUBLIC KEY MANAGEMENT INFRASTRUCTURE USING DIGITAL CERTIFICATES

BACKGROUND OF THE INVENTION

1. Technical Field

This invention relates generally to public key cryptography, public key management infrastructure, and digital certificates issued by a certification authority (CA), which together form part of a public key infrastructure (PKI). More specifically, the invention relates to computer-implemented techniques based on digital certificates for managing the risks associated with a public key management infrastructure shared by multiple users.

2. Background Art

Public key cryptography is an approach to enabling secure communications using key pairs. Each key pair includes a public key and a private key. The public key and private key are related so that a message encrypted by one key may be decrypted only by the other, but it is computationally infeasible to deduce the private key given the public key. The private key is typically created and securely held by an entity; while the corresponding public key is typically made widely available. Secure communications between parties may then be enabled by using the parties' public and private keys.

The use of public key cryptography addresses many of the inherent security problems in an open network such as the Internet. However, two significant problems remain. First, parties must be able to access the public keys of other entities in an efficient manner. Second, since in many protocols entities are associated with and in some sense identified by their public keys, there must be a secure method for parties to verify that a certain public key is bound to a certain entity.

A public key management infrastructure addresses these two problems. In one common approach, the public key management infrastructure is based on digital certificates, which are used to associate a certain public key to a certain entity with some degree of integrity. The public key management infrastructure typically would include a database of digital certificates, and various operations are provided in order to access and maintain this database. For example, requests for new digital certificates are processed, digital certificates are revoked, and the status of existing digital certificates is designated and checked.

The public key management infrastructure, then, provides one important link in implementing secure protocols based on public key cryptography. As a result, the integrity of the public key management infrastructure must be secured or, put in another way, risk factors which could degrade the integrity of the public key management infrastructure must be managed. For example, in the case of a digital certificate database (or "repository"), there is usually some risk that someone may make unauthorized changes to the records in the database or that someone may gain access to records for which he should not have access. Alternately, there may be some risk that one of the database or PKI administrators makes a clerical error while maintaining the database. In order to improve the reliability of the public key management infrastructure, it is important to manage these risks to the repository.

The repository risk management policy may be implemented in part by using passwords, personal identification numbers, and the like, to control authentication and authorization. For example, before a database or PKI administrator can access a digital certificate database to make changes, he may be required to input his password. This password may then determine the extent of the administrator's authority, including, for example, the database records which the administrator is permitted to manipulate (i.e., his authorized domain) and/or the operations which he is permitted to perform on these records (i.e., his authorized privileges). The shortcomings of these approaches are well-known. For example, if the password is too simple, a third party may be able to deduce the password by guessing or by using a brute force attack. Alternately, the third party may acquire a password simply by eavesdropping when the administrator inputs the password or when the password is transmitted across an unsecured communications link. Once the third party has acquired the password, he gains access to the database by exploiting the grant of authority associated with the password.

These shortcomings are aggravated when the public key management infrastructure is subjected to use by groups of users. For example, a company may have a number of database and PKI administrators, each of whom is granted the same authority to manipulate the public key management infrastructure. If access to the public key management infrastructure is controlled through the use of passwords, each group of administrators may have a single password which is then distributed to all of its members, but the widespread distribution of the password inherently compromises the discretionary access properties of the particular password. Alternately, individual passwords may be assigned to each administrator in the group, but this results in an administrative burden since a large number of passwords must be maintained and each of these passwords must also be linked to the corresponding domain and/or privileges.

In another approach, the risk management policy may be implemented in part by physically separating different domains. For example, a company may have a number of divisions, each of which issues their own digital certificates and has their own PKI administrators for servicing their digital certificates. If all of the company's digital certificates are stored in a single database on a single computer, there is some risk that an administrator from one division may accidentally manipulate digital certificates from another division, even if the system is designed to prevent this. This risk may be reduced by storing the digital certificates for each division in a separate database, may be reduced even further by running each database on a separate computer, and reduced even further by severing any network links between the computers. This approach, however, has the disadvantage of requiring multiple systems. For example, in the examples given above, multiple separate databases, multiple separate computers and/or multiple separate networks are required. This shortcoming is aggravated since the public key management infrastructure must be secured and, if it is divided into separate systems, each system must also be secured.

In yet another approach, the risk management policy may be implemented by allowing a central authority to access the public key management infrastructure and limiting the access of others. For example, a number of companies may contract for a third party operator to implement the public key management infrastructure on their behalf. In other words, the operator would maintain a database which contained the digital certificates and other authentication information from all of the companies. In this situation, there is a risk that one company's administrator might manipulate the digital certificate records of another company, or even simply that one employee might be able to browse through the digital certificate records of another company. To reduce this risk, the operator might require all repository requests to be funneled through its own personnel. Hence, if an employee from one company wished to perform a search, he would have to submit the search request to the appropriate operator personnel, who would then perform the search. One disadvantage of this approach is that an intermediate layer of operator personnel is required to ensure reliable use of the public key management infrastructure.

Thus, there is a need for efficient techniques which allow multiple users to share a public key management infrastructure, while simultaneously managing the risk associated with such sharing. There is also a need to allow multiple groups to share a public key management infrastructure and a further need to permit this while simultaneously allowing users, including PKI administrators, to directly access the public key management infrastructure.

DISCLOSURE OF INVENTION

In accordance with the present invention, a public key management infrastructure (104) is shared by at least two users (102). A method (300) for managing risk arising from a user's use of the public key management infrastructure includes the following steps. The user (102) is associated (301) with a digital certificate (200) which is issued and digitally signed by a certification authority (CA). The digital certificate (200) represents that the user (102) is bound to a public key (210) corresponding to a private key held by the user (102); the public key (210) and the private key form a key pair for use in public-key cryptography. The digital certificate (200) further includes an access label (216), which may identify the domain (105) within the public key management infrastructure (104) which the user (102) is authorized to access and/or the privileges which the user (102) is authorized to exercise. The user's identity and the validity of the digital certificate (200) are established (303, 305). The access label (216) is read (304) from the user's digital certificate (200), and the user's use of the public key management infrastructure (104) is controlled (306) based upon the access label (216). The verified trust combined with a control system using labels to enforce access limitations constitutes a grant of authority.

In another aspect of the invention, a computer readable medium stores the user's digital certificate (200). In yet another aspect of the invention, a system for controlling use of the public key management infrastructure (104) includes a security engine (106). The security engine (106) validates the user's digital certificate (200) and controls use of the public key management infrastructure (104), based on the access label (216) in the user's digital certificate (200).

In another aspect of the invention, information pertaining to the user (102) is received (401). The appropriate access label (216) for the user (102) is determined (404). User information (206) pertaining to the user (102) and the access label (216) are written (402,406) to the user's digital certificate (200). The digital certificate (200) is digitally signed (408) by the CA issuing the digital certificate.

The present invention is particularly advantageous because the use of digital certificates (200) to enable establishment of the user's identity and the user's authorized domain (105) and/or privileges is significantly more secure and less prone to attacks than alternatives such as passwords. As a result, the risk associated with multiple, potentially mutually hostile users (102) sharing a common public key management infrastructure (104) is more strongly managed and, hence, reduced. Furthermore, the use of access labels (216) for this purpose is a particularly flexible approach which supports the implementation of a wide variety of risk management policies.

BRIEF DESCRIPTION OF THE DRAWINGS

These and other more detailed and specific objects and features of the present invention are more fully disclosed in the following specification, reference being had to the accompanying drawings, in which.

DETAILED DESCRIPTION OF THE PREFERRED EMBODIMENTS

Figure 1A:
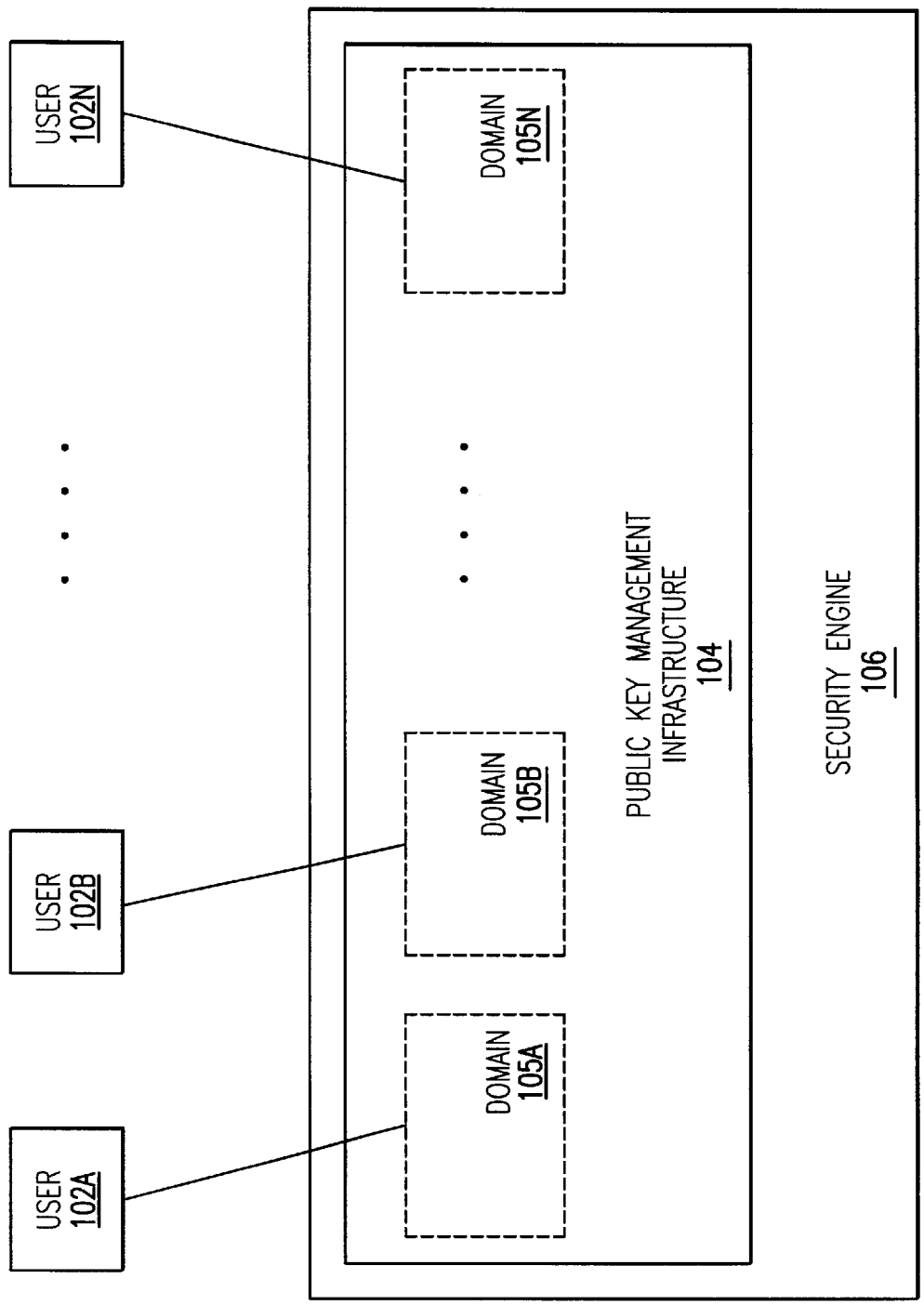
FIG. 1A is a block diagram of a system in accordance with the present invention.

This invention relates generally to public key cryptography, digital signatures, and digital certificates issued by a certification authority (CA), which together form part of a public key infrastructure (PKI). Before turning to the figures, it is useful to first describe these underlying concepts.

Public key cryptography is an approach to secure communications using key pairs. Each key pair includes a public key and a private key, each of which is typically a large number. Typically, the private key is securely created and held by an entity; while the public key is made widely available. The public key and private key are mathematically related so that a message encrypted by one key may be decrypted only by the other, but the relationship is such that it is computationally infeasible to calculate the private key given the public key. In other words, if a third party knows an entity's public key (which is typically the case), it is computationally infeasible to deduce the corresponding private key (which is typically held securely by the entity). Preferred public key algorithms include the RSA algorithm.

A private key may be used to "digitally sign" digital records. An entity "digitally signs" a record by encrypting either the record or a processed version of the record using the entity's private key. This allows a third party to authenticate the record by verifying that (i) it is that entity's private key (rather than some other key) which has been used to digitally sign the record; (ii) the contents of the record have not changed since the record has been digitally signed; and (iii) if the corresponding public key is held to be bound to the entity, then the entity cannot later deny that he digitally signed the record. The first characteristic is often referred to as "proof of origin" or "paternity," the second as "integrity," and the third as "non-repudiation of origin."

Preferably, a record is digitally signed by first producing a one-way hash (see below) of the record, creating what is commonly referred to as a message digest. The message digest is then encrypted using the entity's private key to produce the digital signature for the record. A third party typically receives both the record and corresponding digital signature and then authenticates the record as follows. The third party decrypts the received digital signature using the entity's public key to yield a decrypted message digest, which should be determined to be identical to the original message digest. The third party also generates a one-way hash of the received record, using the same hash function as was used by the entity, to yield a newly generated message digest. The third party then compares the decrypted message digest and the newly generated message digest. If they are determined to be identical, the third party has authenticated the record.

A hash function is a transformation that takes a variable-size input and returns a fixed-size output, which is typically smaller than the input and is referred to as the hash of the input. A one-way function is a transformation that is significantly easier to perform in one direction than in the opposite direction. A one-way hash function is thus a transformation with both of these characteristics. One-way hash functions used to produce digital signatures preferably also produce outputs which are generally smaller in size than the input, are able to handle inputs of any size, are computationally infeasible to reverse, and are collision-free to some degree. Hash functions, by their general nature, are many-to-one functions, meaning that many inputs may map to the same output. However, if the chosen hash function is collision free, this potential problem is obviated for all practical purposes. A hash function is weakly collision free if, given an input, it is computationally infeasible to find another input which maps to the same output. A hash function is strongly collision free if it is computationally infeasible to find any two inputs which map to the same output. Preferred one-way hash functions for creating digital signatures include MD5 and SHA.

The use of public key cryptography addresses many of the inherent security problems in an open network such as the Internet. However, two significant problems remain. First, parties must be able to access the public keys of many entities in an efficient manner. Second, since communications and transactions are secured by relying upon the key pairs and entities are associated with and in some sense identified by their public keys, there must be a secure method for third parties to establish that a certain public key is bound to a certain entity.

A public key management infrastructure addresses these two problems. In a common approach, the public key management infrastructure is based on digital certificates. A "digital certificate" is a record which represents that a certain public key is bound to a certain entity, such as an individual, a legal entity, a web server, or other types of users. More specifically, a digital certificate preferably is issued by a third party known as a certification authority (CA) and asserts, based on the CA's reputation and its practices, that the certain public key is bound to the certain entity. The digital certificate contains information pertaining to the identity of the entity (a.k.a., the subscriber of the CA service or the subject of the digital certificate) and the entity's public key, and the digital certificate is digitally signed by the CA to secure this information.

The digital certificate represents that the public key in the digital certificate is bound to the certificate's subject. Parties who wish to validate this status may verify the CA's digital signature and the integrity of the contents of the digital certificate in the manner described above. If the validating party additionally trusts the CA's practices or otherwise recognizes a digital certificate as being trustworthy (e.g., based on past experience), then for the validating party's purposes the digital certificate is valid. This also means that the validating party has established that the public key in the digital certificate is bound to the certificate's subject. Hence, if an unknown party communicates with the validating party using the private key corresponding to the public key in the digital certificate, then the validating party can further establish that the unknown party is the subject named in the digital certificate. That is, he can authenticate the unknown party. If the validating party does not have a basis for trusting the CA issuing the certificate, the validating party will begin to establish such a basis by validating the CA's own digital certificate. The validating party will continue to validate digital certificates, traversing up a chain of digital certificates issued to CAs, until it reaches a trust point, at which point, the validating party can establish that the public key in the digital certificate is bound to the certificate's subject.

Digital certificates preferably comply with the ITU-T Recommendation X.509 (1997 E), as developed by the ISO/IEC/ITU groups (hereafter, "X.509"). The digital certificate may be stored on or in any type of computer readable media, including but not limited to hard drives, smart cards, flash memory, floppy drives, magnetic stripes such as on the back of credit cards, or as printed bar codes. They are commonly transferred over network protocols.

For security and other reasons, digital certificates typically expire after a certain period of time. For example, when digital certificates are issued, they may have an effective date and an expiration date, with the digital certificate being potentially valid only between these dates. Furthermore, if a digital certificate is revoked prior to its expiration date, notice of that status may be issued by placing it onto a certificate revocation list (CRL) or by other means.

A public key infrastructure (PKI) is a system of digital certificates, CAs, and other infrastructure for authenticating parties. A number of digital certificate services are typically provided in order to establish, disseminate, maintain, and service the public keys and associated digital certificates used in a PKI. These services are typically provided by CAs or third party operators to end users. The digital certificate services provided typically include the following:

Enrollment—User provides information about its identity. CA verifies information and creates a valid digital certificate for user.

Check status—User checks whether a digital certificate is valid, revoked or has other status.

Retrieval—User retrieves a copy of a digital certificate.

Search—User searches for digital certificates which meet certain search criteria.

Validation—User establishes that a digital certificate is currently or historically valid, and is/was not revoked.

Revocation—User and CA act to revoke a digital certificate.

Renewal—User and CA create a new valid digital certificate, replacing a digital certificate about to expire.

Replacement—CA creates a new valid digital certificate, replacing a digital certificate which has been revoked.

Turning now to the figures, FIG. 1A is a block diagram of a system in accordance with the present invention. The system includes at least two users 102A–102N (collectively, 102) who share a public key management infrastructure 104. In order to manage the risks associated with public key management infrastructure 104, each of the users 102 may be restricted with respect to which portions (or domains) of the public key management infrastructure 104 he may access and/or what privileges he has with respect to his authorized domains. For example, in FIG. 1A, the public key management infrastructure 104 is segmented into domains 105A–105N. User 102A is authorized to access domain 105A; user 102B is authorized to access domain 105B, and so on. The users 102 may have limited privileges (not shown) for manipulating their respective domains 105. The system also includes a security engine 106, which uses the public key cryptography, digital signature, control, enforcement, and digital certificate concepts described previously to ensure that each user 102's access to the shared public key management infrastructure 104 is limited to the user's grant of authority (i.e., the domains 105 and privileges for which the user 102 is authorized). Security engine 106 preferably is implemented as software running on a computer. Alternately, it may be firmware running on a personal security peripheral or a remote process operated by a service provider.

Figure 1B:
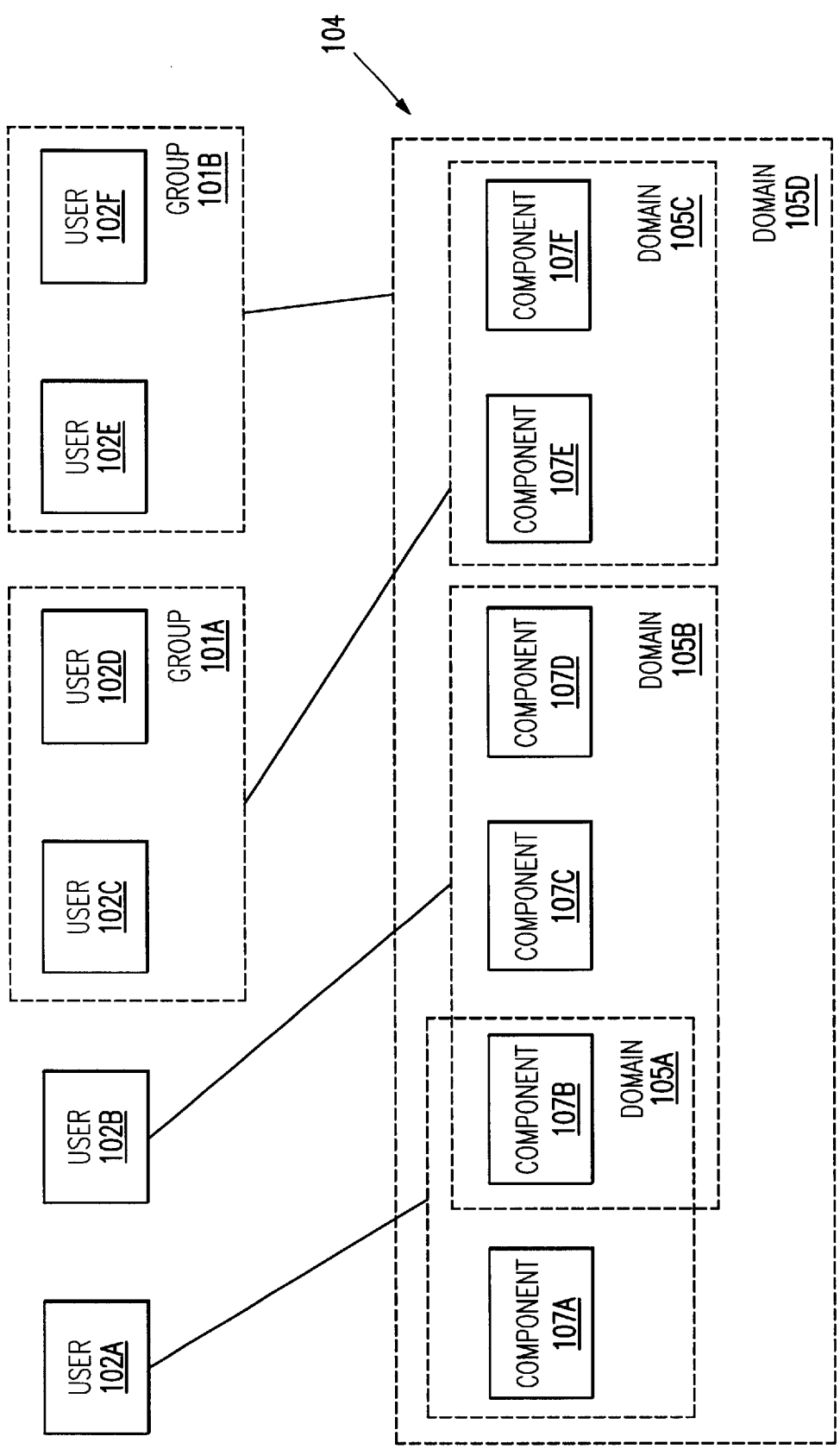
FIGS. 1B–1C are block diagrams illustrating various manners for segmenting public key management infrastructure 104 into domains 105 authorized for various users 102.
Figure 1C:
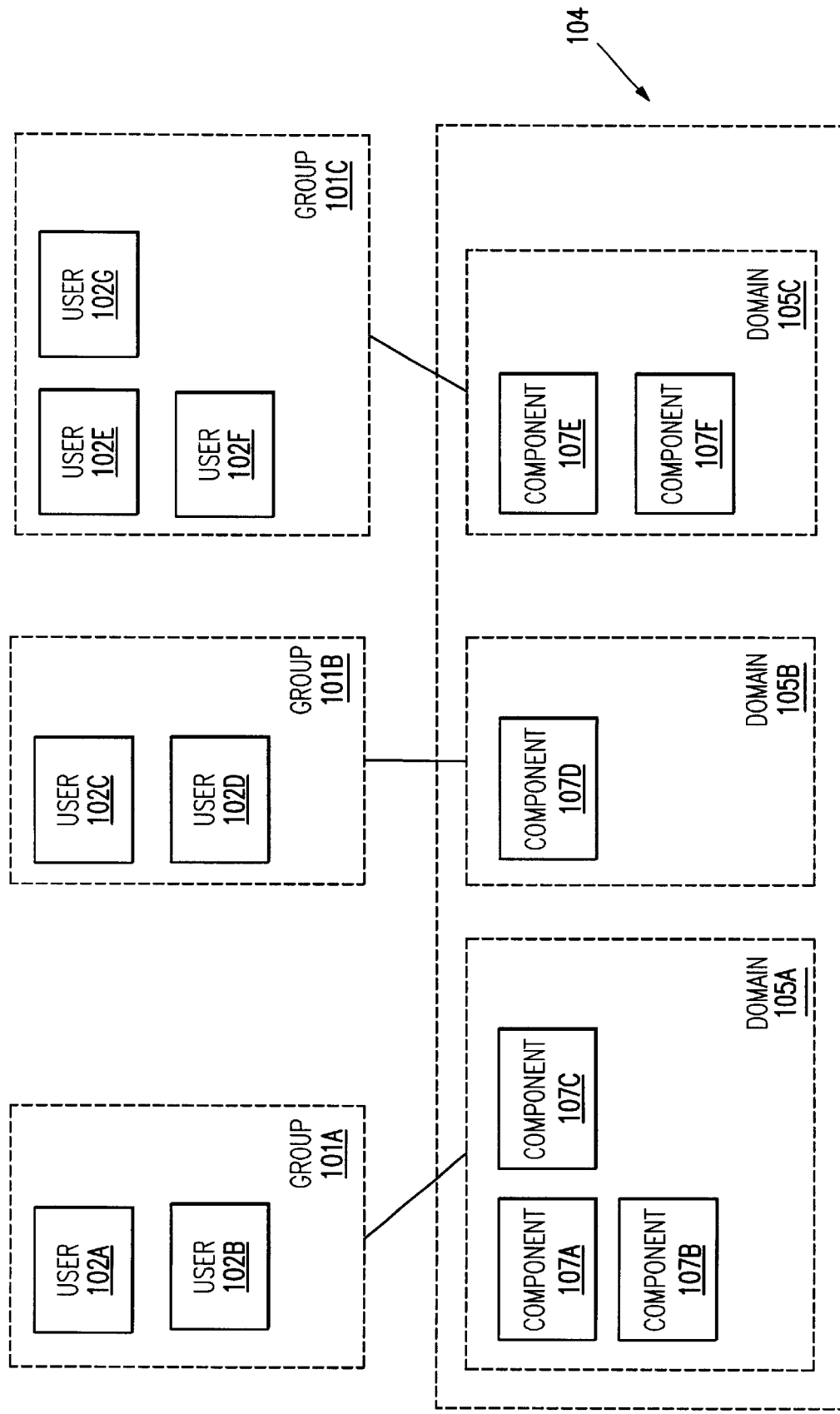

FIGS. 1B–1C are block diagrams illustrating various manners for segmenting public key management infrastructure 104 into domains 105 authorized for various users 102. FIGS. 1B–1C are illustrative only and other manners for segmenting the public key management infrastructure 104 into domains 105 will be apparent. In FIG. 1B, shared public key management infrastructure 104 includes six components 107A–107F, which are segmented into four domains 105A–105D for the six users 102A–102F. In particular, user 102A is authorized to access domain 105A, which includes components 107A–107B. User 102B is authorized to access domain 105B, including components 107B–107D. Users 102C–102D form a group 101A, which is authorized to access domain 105C, including components 107E–107F. Users 102E–102F form a group 101B authorized to access all six components 107A–F of the public key management infrastructure 104.

FIG. 1C illustrates a preferred embodiment, in which the seven users 102A–102G belong to three groups 101A–101C. The public key management infrastructure 104 includes six components 107A–107F, which are divided into three domains 105A–105C, each of which is associated with one of the groups 101. Each user 102 is authorized to access the domain 105 associated with his respective group 101. Thus, for example, user 102A would be authorized to access any of the components 107A–107C; while user 102G would be authorized to access the components 107E–107F.

In an alternate embodiment, the group 101C and corresponding domain 105C is "public;" while the other groups 101A–101B and domains 105A–105B are "private." The private groups 101A–101B are authorized to access their corresponding private domain 105A–105B and also the public domain 105C; while the public group 101C may only access the public domain 105C.

In a preferred embodiment which shall be referred to as the operator embodiment, the groups 101 are various organizations, such as departments of companies, who wish to issue digital certificates to their employees. The public key management infrastructure 104 contains a database of records pertaining to digital certificates, with each component 107 being a separate logical record. Some records pertain to issued digital certificates; while others relate to requests for new digital certificates, requests for other digital certificate services, audit data, and control policy information. The organizations, however, do not wish to build the database 104 necessary to maintain the records 107 for the digital certificates or to provide all of the associated digital certificate services. Instead, they contract for a third party operator to manage the records 107 in a database 104; to provide adequate security, reliability, dependability, and redundancy for the database 104 and digital certificate services; and to provide sufficient tools to allow users to easily access the records 107. The organization, however, may wish to retain at least partial control over the performance of acts such as issuing, renewing, replacing and/or revoking digital certificates; but may relinquish control to the operator for other services such as performing a search for a digital certificate or providing copies of a digital certificates.

In this preferred embodiment, the users 102 are employees of the various organizations and may indirectly or directly access the database records 107 over the Internet via browsers such as Netscape Navigator or Microsoft Internet Explorer. In some situations, however, this may not be possible or desirable. For example, not every user 102 may have direct access to the Internet or an organization may desire to limit its employees' access to the Internet, for security or other reasons. In these situations, the users 102 may access the shared database 104 via other methods, such as over private communications networks or by accumulating database requests and processing them in a batch-processing mode.

For reasons of overall efficiency, the operator, in turn, maintains all of the digital certificate records from all of its customer organizations in a single database 104, thus reducing the duplication of public key management infrastructure. However, to reduce the risk of one organization accessing another's records 107, the operator segments the database 104 into domains 105, one for each organization, with the domain 105 associated with a specific organization including that organization's records 107. Users 102 from different organizations typically will use the same software tools but will only be authorized to access the records associated with their organization (i.e., their organization's domain 105). The security engine 106 ensures that a user 102 cannot access records for other organizations (i.e., the domains 105 of other organizations).

As another example, public key management infrastructure 104 may contain a database containing the digital certificate records for a company. The groups 101 may be various departments or classes within the company and the domains 105 may be the records corresponding to the various groups. For example, if the company is a manufacturing company, the company might consider it prudent to segregate the digital certificates for the sales department from those for the accounting department. Two of the groups 101 would then be the sales and accounting departments, with the corresponding domains 105 containing the relevant database records 107. Alternately, if the company is a bank, it might be prudent to segregate the digital certificate records for the internal auditors from those for the tellers.

As a final example, consider a situation in which the risk management policy distinguishes on the basis of privileges granted rather than domains 105. Here, the digital certificate database 104 may contain the digital certificate records for a small company. The users 102 are employees of the company, each of whom may access all of the records 107 in the database 104. The majority of users 102 will be simple users of digital certificates and the corresponding services, and will not be granted any privileges to change information contained in the database 104. However, some users 102 will be PKI administrators responsible for carrying out the digital certificate services which the organization has retained. These administrators will perform broader functions than the other employees, such as approving new digital certificates, and thus will be granted privileges such as to change existing information in the database. The difference between PKI administrators and mere users is a difference in privileges in manipulating the information in the database, not a difference in which domain the user may access.

Other applications will be apparent, and the invention is not limited to the above examples. For example, the users 102 need not be individuals; they may also be computers, legal entities, groups of individuals, groups of groups, or other entities. In the operator embodiment, the organization and the operator may have any number of different relationships. For example, in one case, the organization may be the CA and will digitally sign the digital certificates issued to its employees; while in another, the operator may perform some CA duties. Alternately, the organization may function as a registration authority to a CA, conveying PKI transactions to and from the CA. As yet another example, in one case, the organization may retain very little control or responsibility for controlling digital certificate services; while in another, the organization a may retain significant control and responsibility.

Figure 2:
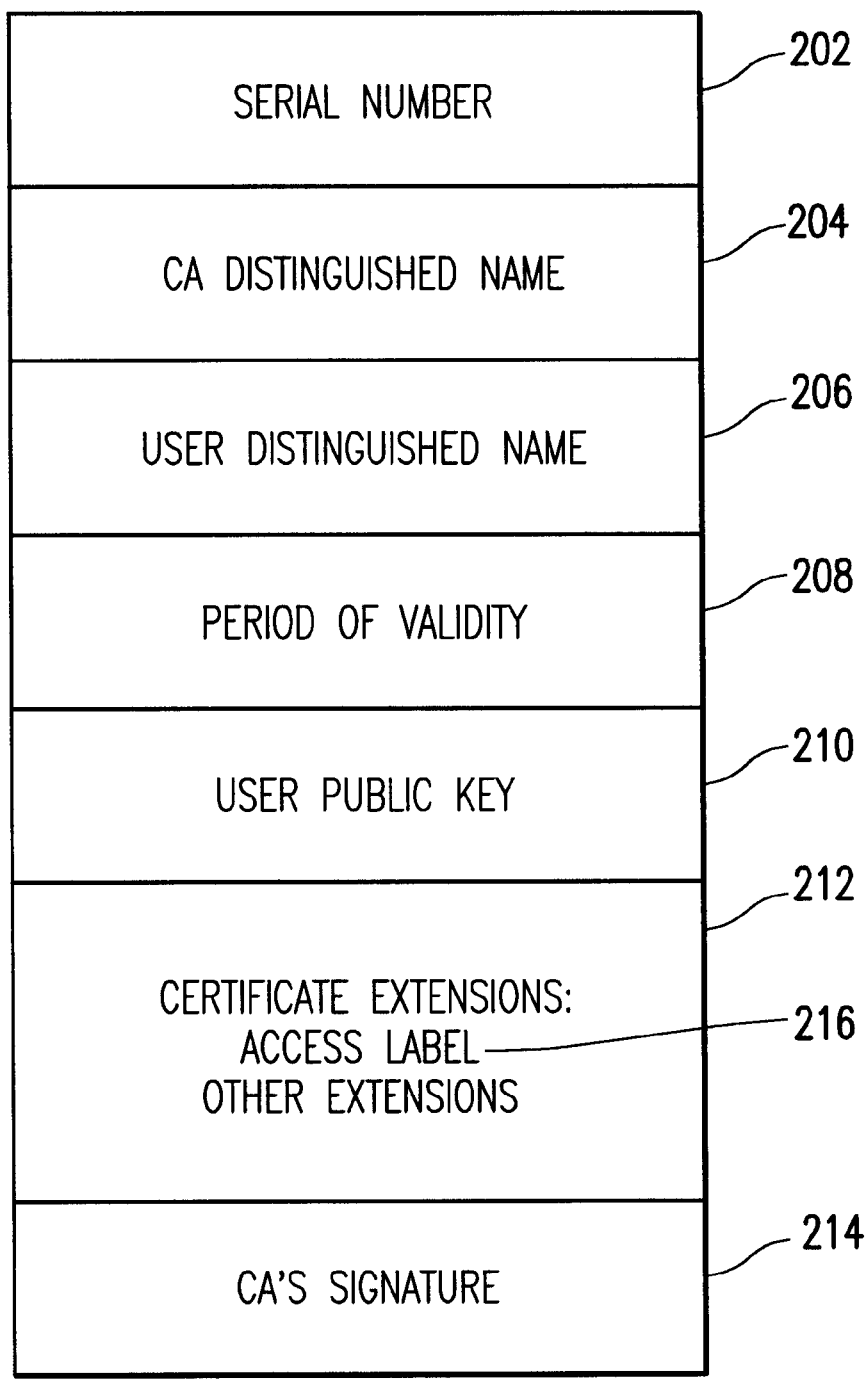
FIG. 2 is a preferred embodiment of a digital certificate 200 in accordance with the present invention.

FIG. 2 is a preferred embodiment of a digital certificate 200 in accordance with the present invention. The digital certificate 200 uses the X.509 format and includes a serial number 202, the CA's distinguished name 204, the user 102's distinguished name 206, a period of validity 208, the user 102's public key 210, possibly digital certificate extensions 212, and the CA's digital signature 214. The serial number 202 partially identifies the digital certificate 200; CAs typically provide a unique serial number 202 for each digital certificate 200 issued by the CA. The distinguished names for the CA and user 102 includes information about the CA or user 102, respectively, such as name, address, affiliation, and/or email address. The period of validity 208 contains information regarding the time period during which the digital certificate 200 is potentially valid. Digital certificate extensions 212 are information which may be tailored by various CAs and users for their specific purposes. In this particular embodiment, the digital certificate extensions 212 are proprietary, published extensions following the X.509 convention and include an access label 216 which is used to signal the authority granted to the user with respect to use of the shared public key management infrastructure 104. The CA's digital signature 214 is a version of the information in the digital certificate 200 which has been processed using the CA's private key (typically one-way hashed and then encrypted with the CA's private key) and enables the digital certificate 200 to serve as an authenticatable record.

The access label 216 identifies the domains and/or privileges for which the user 102 is authorized. It may take any number of forms. For example, access label 216 may include different extensions identifying and/or defining the relevant domains and privileges. In a preferred embodiment, access label 216 includes a domain identifier which identifies the domain 105 which the user 102 may access and all users who have authority to access the same domain 105 will have the same access label 216 in their corresponding digital certificates.

In the operator embodiment, the access label 216 is a one-way hash of the organization name, which shall be referred to as a jurisdiction hash. Since organizations may be identified by company and department name, the access label is preferably a one-way hash of the concatenation of company name and department name. Using a hash is advantageous because the access label 216 will be a constant size. In addition, similarly named organizations will not have similar hashes, thus reducing confusion. The records contained in the digital certificate database 104 preferably also include the same jurisdiction hash. Then, when a user 102 accesses the database, the jurisdiction hash on the user's digital certificate 200 need only be compared to the jurisdiction hash on a database record to determine whether that record is included in the user 102's domain 105.

In alternate embodiments, the access label 216 may include multiple jurisdiction hashes to accommodate users 102 who belong to more than one organization. Alternately, the access label 216 may include a list of related jurisdiction hashes. For example, if user 102 was a member of one department within a company and the company was then reorganized or the department name was changed, user 102's digital certificate might include his new department name in the jurisdiction hash and his former department name in the list of related jurisdiction hashes. Other types of access label 216, such as access labels 216 based on hierarchical schemes or other algebras, will be apparent.

Figure 3:
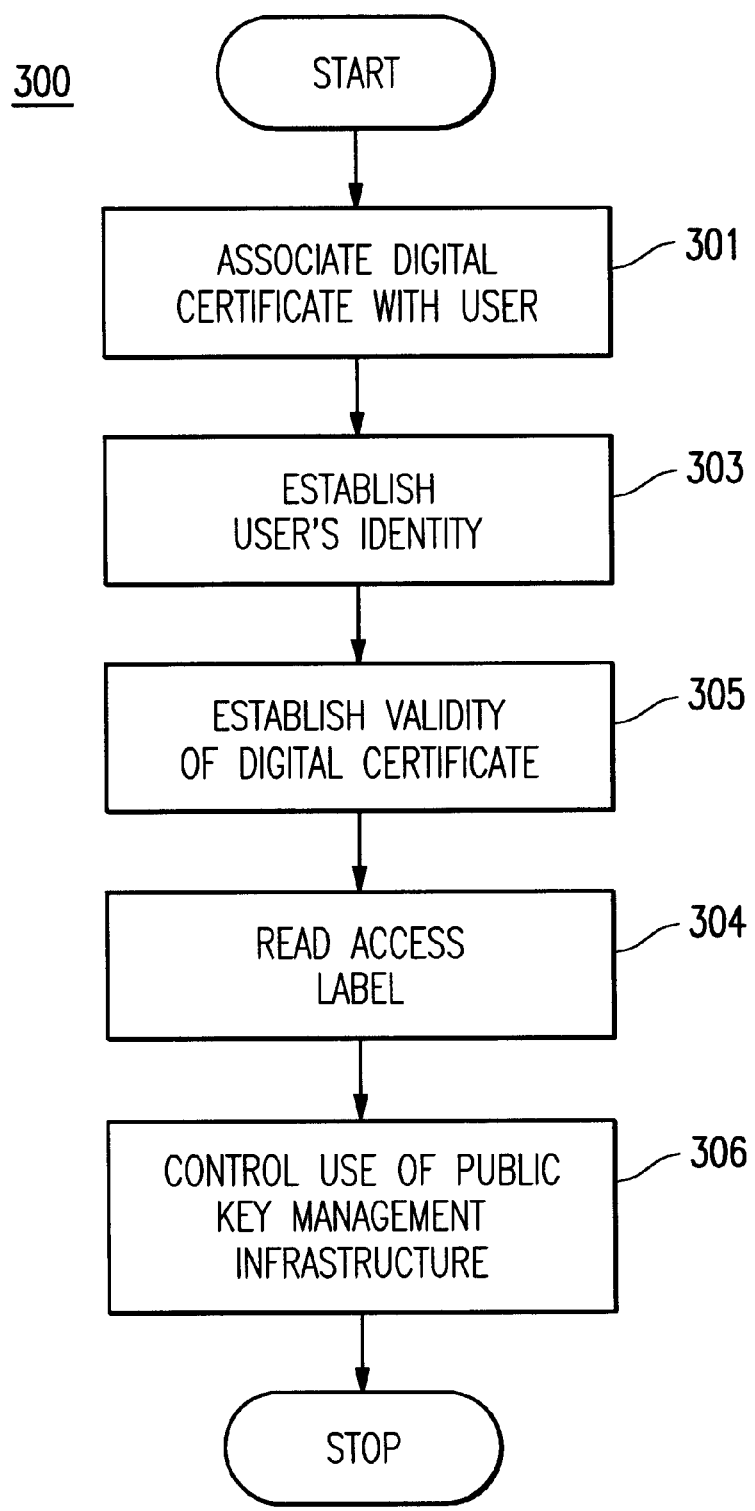
FIG. 3 is a flow diagram illustrating a method 300 using digital certificates 200 for controlling use of a public key management infrastructure 104 shared by multiple users 102.

FIG. 3 is a flow diagram illustrating a method 300 for controlling access to and use of the public key management infrastructure 104 using digital certificate 200. User 102 wishes to exercise his authorized privileges in his authorized domain 105 of public key management infrastructure 104. To do this, user 102 may provide one of his digital certificates 200 to security engine 106. Alternately, security engine 106 may retrieve one of the user's digital certificates 200 based on information provided by user 102. Either way, a digital certificate 200 is associated 301 with user 102. Security engine 106 establishes 305 the validity of the digital certificate 200, preferably by authenticating the user's digital certificate 200 as described previously in the introductory section or on some independent basis, such as past transactions with or past authentication of digital certificate 200 data. Security engine 106 also establishes 303 user 102's identity, preferably by using the SSL protocol to establish that user 102 holds the private key corresponding to the public key contained in the digital certificate 200.

Security engine 106 reads 304 the access label 216 from the user's digital certificate 200. If the digital certificate 200 is determined to be valid, the security engine 106 has reasonable assurance that the access label 216 has not been tampered with. Security engine 106 is further reasonably assured that the user 102 named in the digital certificate has the specific authority specified by access label 216 because the access label 216 cannot be assigned to a third party without a digital certificate being generated (e.g., as would be the case when a third party eavesdrops someone else's password and then uses that password). The security engine 106 controls 306 the user's use of public key management infrastructure 104 based on access label 216, permitting user 102 to exercise the privileges and access the domains for which he is authorized.

In the operator embodiment, the public key management infrastructure 104 is a database of digital certificate records, and the access label 216 is preferably a jurisdiction hash. The user's digital certificate 200 preferably contains this hash, as do all of the organization's sensitive records in the database. Hence, the records stored in the database may be segmented into various domains, one for each organization, based on the jurisdiction hash. When a user 102 accesses the database of digital certificates, he will be able to use only the domain for his organization. More specifically, a user 102 will be able to access only those records associated with a jurisdiction hash matching the one on the user's digital certificate 200. In an alternate approach, the database 104 may be segmented into private and public domains as described above and the security engine 106 may allow the user 102 to access the entirety of the database 104, except for those private domains which do not match the user 102's jurisdiction hash. In other words, the public domains would be defined as matching all jurisdiction hashes.

In this embodiment, the majority of users 102 will be simple users of digital certificates and the corresponding services, and will not be granted any privileges to change information contained in the database. However, some employees will be PKI administrators responsible for carrying out the digital certificate services which the organization has retained. These PKI administrators will perform broader functions than the other employees, such as approving new digital certificates, and thus will be granted privileges to change information in the database. The difference between PKI administrators and mere users is a difference in the privileges assigned to them for manipulating the information in the database, not a difference in which subset of the database may be used. Hence, the mere users and the PKI administrators preferably will use the same domain identifiers since each is authorized to use the same domain, but other portions of their access labels 216 may differ to indicate the difference in privileges. In one approach, the digital certificates of the PKI administrators preferably contain the relevant domain identifiers while those of the mere users do not. Rather, the mere users access the shared database over the Internet through specific web pages. Unknown to the mere user, the relevant domain identifier is embedded in these web pages and transmitted to the security engine 106 when the mere user accesses the database. Note that although the actual digital certificate of a mere user does not contain the domain identifier, the corresponding record in the shared database does contain the domain identifier in order to correctly define the domain 105.

As a more specific example, consider a situation in which responsibility for approving new digital certificates is split between an organization and the CA/operator. For example, when one of the organization's employees requests a digital certificate, he may provide his name, department, certain information about his position within the organization such as job title or mail stop, and other information external to the organization such as personal email address or digital certificates issued by other organizations. The organization may have responsibility for confirming the organization-specific information and perhaps even adding further information such as salary or authority to approve purchases up to a certain amount. The operator may have responsibility for confirming information which is not organization-specific and may then generate and digitally sign the employee's digital certificate by acting as the CA.

The task of issuing a new digital certificate then occurs as follows in this specific example. First, the employee enters his request for a digital certificate via one of the servers or web pages containing the domain identifier. When the employee does this, not only is the relevant information stored for subsequent processing, but his request is also tagged with the corresponding domain identifier. In this embodiment, the pending request is saved in the same database as the issued digital certificates. Hence, a PKI administrator may access both pending requests and issued digital certificates by accessing a single database. In order to gain access to the database, the administrator presents his digital certificate to establish his identity, which is authenticated. The employee's request is then accessible to the administrator because the domain identifier tagging the employee's request matches the one on the administrator's digital certificate, meaning that the administrator must be an administrator for the employee's organization. The administrator processes the employee's request, for example, by verifying the information provided by the employee against the organization's databases or by supplying additional information.

A record of the actions taken by the administrator is generated, preferably including which database record was modified, what the modification was, and which administrator made the modification. The administrator preferably also digitally signs the record, thus providing a strong evidentiary trail of the administrator's actions (see previous discussion regarding the characteristics of digital signatures). If necessary, operator personnel may then access the database to complete the process of issuing a new digital certificate to the organization's employee.

In an alternate embodiment, the shared public key management infrastructure 104 may contain database records which are digitally signed. Each signed record also includes a domain identifier. Hence, in step 306, if the access label 216 in the user 102's digital certificate 200 matches the domain identifier in the digitally signed record, the security engine 106 allows user 102 to access the record. Since these records are digitally signed, presumably by a trusted signer, there are additional assurances that the information and domain identifier contained in them are trustworthy.

Figure 4:
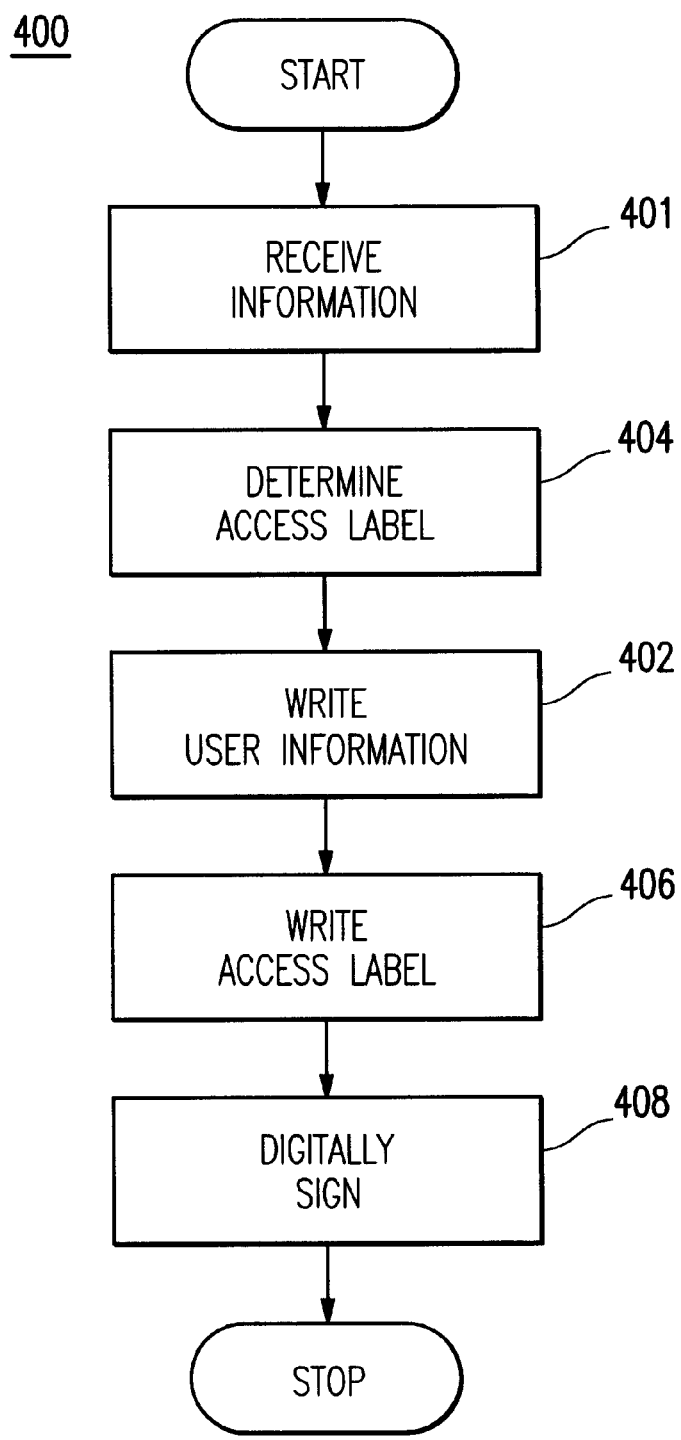
FIG. 4 is a flow diagram illustrating a method 400 for creating digital certificate 200.

FIG. 4 is a flow diagram illustrating a method 400 for creating a digital certificate 200 for a user 102. Information pertaining to the user 102 and/or his group is received 401. For example, the received information might include the user 102's name, mailing address, email address, etc.; the group's name (such as company and department name), physical location, etc.; and/or information pertaining to the user 102's authorized domains or privileges. This information preferably is verified. For example, if the CA is verifying the information, it preferably would do so following its generally established practices. Based on this received information, the appropriate access label 216 for the user 102 is determined 404 to represent the user 102's grant of authority. If users are associated with groups, the determination 404 may be made by determining with which group the user 102 is associated and then determining the appropriate access label 216 for the user's group. The CA writes 402,406 user information about user 102, such as the user distinguished name 206, and the access label 216 to the digital certificate 200. CA then digitally signs 408 the digital certificate 200.

In method 400, the appropriate access label 216, and hence the corresponding domains and privileges, are determined 404 when the digital certificate is created, not when it is used. This has several advantages. For example, since the determination need not be made in real-time and need not be based solely on the information contained in the digital certificate 200, as would typically be the case if the determination were made each time the digital certificate was used, the determination can be based on a more thorough investigation and analysis of the user 102 and/or his group. In addition, if the determination of the appropriate domain was made each time the digital certificate was used, more processing power would be required to enable the use of digital certificates, particularly if the determination was rather complex. It also might not be feasible to make the determination each time the digital certificate was used since the party who had the authority to assign the appropriate domain and privileges may not be involved in the transaction when the digital certificate is used. Granting authority during creation of the digital certificate alleviates these problems. In addition, the integrity characteristic of digital certificates allows the access label 216 to be stored such that tampering may be detected.

In the operator embodiment, the operator and/or the customer organization may administer the shared database and determine 404 the appropriate access label 216, depending on the circumstances. However, the organization's PKI administrators preferably control the issuing of new digital certificates, because the organization typically prefers to control this process and the operator typically prefers not to. This arrangement also allows for customization. For example, the user information written 402 to the digital certificate 200 may vary from organization to organization. Alternately, the PKI administrator may determine 404 the user 102's authority based on information not available to the operator, such as the organization's internal files.

The above description is included to illustrate the operation of the preferred embodiments and is not meant to limit the scope of the invention. The scope of the invention is to be limited only by the following claims. From the above discussion, many variations will be apparent to one skilled in the art that would yet be encompassed by the spirit and scope of the present invention.

What is claimed is:

1. In a system including a public key management infrastructure shared by at least two groups of users, wherein the public key management infrastructure includes a database of digital certificates issued to the users, a method for managing risk arising from a user's use of the public key management infrastructure, the method comprising:

dividing the database into domains, each domain including digital certificates issued to users in one of the groups;

receiving a digital certificate for a user, wherein the digital certificate is issued by a CA to the user, the digital certificate represents that the user is bound to a public key corresponding to a private key held by the user, the public key and the private key form a key pair for use in public-key cryptography, the digital certificate includes a domain identifier, and the digital certificate is digitally signed by the CA;

establishing a validity of the digital certificate;

establishing the user's identity;

reading the domain identifier from the user's digital certificate; and permitting the user to access digital certificates included in the domain identified by the domain identifier.

2. The method of claim 1 wherein:

the database includes records, each record including information pertaining to a digital certificate;

each domain includes records for digital certificates in the domain;

each record includes a domain identifier for identifying which domain includes the record; and the step of permitting the user to access the digital certificates includes precluding the user from accessing a record when the domain identifier in the record does not match the domain identifier contained in the user's digital certificate.

3. The method of claim 1 wherein:

the database includes records, each record including information pertaining to a digital certificate;

each domain includes records for digital certificates in the domain;

each record includes a domain identifier for identifying which domain includes the record; and the step of permitting the user to access the digital certificates includes permitting the user to access a record when the domain identifier in the record matches the domain identifier contained in the user's digital certificate.

4. The method of claim 1 wherein:

the database includes records, each record including information pertaining to a digital certificate;

each domain includes records for digital certificates in the domain;

each record includes a domain identifier for identifying which domain includes the record;

the step of receiving a digital certificate for a user comprises receiving a digital certificate for a PKI administrator; and the step of permitting the user to access the digital certificates includes permitting the PKI administrator to change a record when the domain identifier in the record matches the domain identifier contained in the PKI administrator's digital certificate.

5. The method of claim 4 wherein:

the PKI administrator's digital certificate further includes privileges information; and the step of permitting the user to access the digital certificates includes permitting the PKI administrator to change a record according to the privileges information.

6. The method of claim 4 further comprising the step of:

generating a record of changes made by the PKI administrator.

7. A computer readable medium for managing risk arising from a user's use of a public key management infrastructure, wherein the public key management infrastructure is shared by at least two groups of users and includes a database of digital certificates issued to users, the computer readable medium storing:

a digital certificate issued by a CA to a user, wherein the digital certificate represents that the user is bound to a public key corresponding to a private key held by the user, the public key and the private key form a key pair for use in public-key cryptography, the digital certificate is digitally signed by the CA, and the digital certificate includes:

user information pertaining to the user, and a domain identifier which permits the user to access digital certificates included in the domain identified by the domain identifier, wherein the domain includes digital certificates for the user's group.

8. The computer readable medium of claim 7 wherein:

the domain identifier additionally identifies the user's group.

9. The computer readable medium of claim 7 wherein:

the domain identifier includes information that has been one-way hashed.

10. The computer readable medium of claim 7 wherein:

the digital certificate complies with the X.509 format; and the domain identifier is contained in an X.509 extension.

11. A method for managing risk arising from a user's use of a public key management infrastructure, wherein the public key management infrastructure is shared by at least two groups of users and includes a database of digital certificates issued to users, the method comprising:

receiving information pertaining to a user;

including in a digital certificate user information pertaining to the user, wherein the digital certificate is issued by a CA, the digital certificate represents that the user is bound to a public key corresponding to a private key held by the user, the public key and the private key form a key pair for use in public-key cryptography, and the digital certificate is digitally signed by the CA;

determining a domain identifier appropriate for the user, wherein the domain identifier permits the user to access digital certificates included in the domain identified by the domain identifier, and the domain includes digital certificates for the user's group; and including in the digital certificate the domain identifier.

12. The method of claim 11 wherein:

the digital certificate complies with the X.509 format; and the step of including in the digital certificate the domain identifier comprises including the domain identifier in an X.509 extension.

13. The method of claim 11 wherein:

the step of receiving information pertaining to a user comprises receiving information pertaining to the user's group; and the step of determining a domain identifier appropriate for the user comprises determining the domain identifier for the user's group.

14. The method of claim 13 wherein:

the step of receiving information pertaining to the user's group comprises receiving a name of the user's group; and the step of including in the digital certificate a domain identifier comprises:
  producing a one-way hash of the name of the user's group, and
  including the one-way hash in the digital certificate.

15. A system comprising:

a public key management infrastructure shared by at least two groups of users and including a database of digital certificates issued to users;

a security engine coupled to the public key management infrastructure for managing risk arising from shared use of the public key management infrastructure; and a digital certificate accessible by the security engine, wherein the digital certificate is issued by a CA to the user, the digital certificate represents that the user is bound to a public key corresponding to a private key held by the user, the public key and the private key form a key pair for use in public-key cryptography, the digital certificate includes a domain identifier, and the digital certificate is digitally signed by the CA;

wherein the security engine establishes the user's identity, validates the user's digital certificate, and permits the user to access digital certificates included in the domain identified by the domain identifier, such domain including digital certificates for the user's group.

16. The system of claim 15 wherein:

the database includes records, each record containing information pertaining to a digital certificate;

each domain includes records for digital certificates in the domain;

each record includes a domain identifier for identifying which domain includes the record; and the security engine permits the user to access a record when the domain identifier in the user's digital certificate matches the domain identifier in the record.

\* \* \* \* \*